US010528948B2

(12) United States Patent
Zoldi et al.

(10) Patent No.: US 10,528,948 B2
(45) Date of Patent: Jan. 7, 2020

(54) FALSE POSITIVE REDUCTION IN ABNORMALITY DETECTION SYSTEM MODELS

(71) Applicant: FAIR ISAAC CORP., San Jose, CA (US)

(72) Inventors: Scott M. Zoldi, San Diego, CA (US); David Griegel, San Diego, CA (US)

(73) Assignee: Fair Isaac Corporation, San Jose, CA (US)

( * ) Notice: Subject to any disclaimer, the term of this patent is extended or adjusted under 35 U.S.C. 154(b) by 757 days.

(21) Appl. No.: 14/726,366

(22) Filed: May 29, 2015

(65) Prior Publication Data

US 2016/0350758 A1  Dec. 1, 2016

(51) Int. Cl.
*G06Q 20/40* (2012.01)
*G06Q 20/38* (2012.01)
(Continued)

(52) U.S. Cl.
CPC ......... *G06Q 20/4016* (2013.01); *G06Q 10/04* (2013.01); *G06Q 10/10* (2013.01); *G06Q 20/382* (2013.01)

(58) Field of Classification Search
CPC .................................................. G06Q 20/4016
(Continued)

(56) References Cited

U.S. PATENT DOCUMENTS 5,819,226 A * 10/1998 Gopinathan ........... G06Q 20/00
705/44
7,505,868 B1    3/2009 Shan
(Continued)

FOREIGN PATENT DOCUMENTS

WO    WO-03098505 A1 * 11/2003 ............. G06Q 20/04
WO    WO-2007041709 A1 * 4/2007 ........... G06Q 10/067
WO    WO-2012140601 A1 * 10/2012 ......... G06K 9/00496

OTHER PUBLICATIONS

"Credit Card Fraud Detection Using Meta-Learning: Issues and Initial Results," Salvatore J. Stolfo; David W. Fan; Wenke Lee; and Andreas L. Prodromidis. AAA 1 Technical Report WS-97-07. Copyright 1997. (Year: 1997).*

*Primary Examiner* — Sara C Hamilton
(74) *Attorney, Agent, or Firm* — Mintz, Levin, Cohn, Ferris, Glovsky and Popeo, P.C.

(57) ABSTRACT

The subject matter disclosed herein provides methods, apparatus, systems, techniques, and articles for false positive reduction in abnormality detection models. A date and time of a first transaction by a transaction entity and associated with a transaction characteristic can be stored. Data representing subsequent transactions associated with the transaction characteristic can be stored. A history marker profile specific to the transaction characteristic and transaction entity can be generated and can include the transaction characteristic, the date and time of the first transaction, and maximum and mean abnormality scores. A date and time of a current transaction can be determined. A current abnormality score for the current transaction can be received. A tenure of the observed transaction characteristic can be computed. The current abnormality score can be recalibrated from the transaction entity abnormality detection system according to the maximum, mean, and current abnormality scores and a length of the tenure.

18 Claims, 7 Drawing Sheets

US 10,528,948 B2
Page 2

(51) Int. Cl.
*G06Q 10/04* (2012.01)
*G06Q 10/10* (2012.01)

(58) Field of Classification Search
USPC .......................................................... 705/35
See application file for complete search history.

(56) References Cited

U.S. PATENT DOCUMENTS

| | | | |
|---|---|---|---|
| 7,668,769 B2* | 2/2010 | Baker | G06Q 10/067 705/35 |
| 8,666,841 B1* | 3/2014 | Claridge | G06Q 20/4016 705/26.1 |
| 2005/0091151 A1 | 4/2005 | Coleman et al. | |
| 2010/0094767 A1* | 4/2010 | Miltonberger | G06Q 10/067 705/325 |
| 2010/0169192 A1* | 7/2010 | Zoldi | G06Q 40/00 705/30 |
| 2011/0173116 A1* | 7/2011 | Yan | G06Q 10/067 705/38 |
| 2011/0213788 A1* | 9/2011 | Zhao | G06F 17/30702 707/751 |
| 2012/0030083 A1 | 2/2012 | Newman et al. | |
| 2013/0018795 A1* | 1/2013 | Kolhatkar | G06Q 20/4016 705/44 |
| 2013/0024300 A1* | 1/2013 | Choudhuri | G06Q 30/018 705/16 |
| 2013/0024339 A1* | 1/2013 | Choudhuri | G06Q 30/0185 705/35 |
| 2013/0024358 A1* | 1/2013 | Choudhuri | G06Q 20/4016 705/38 |
| 2013/0024361 A1* | 1/2013 | Choudhuri | G06Q 40/02 705/39 |
| 2013/0024373 A1* | 1/2013 | Choudhuri | G06Q 30/018 705/42 |
| 2013/0024375 A1* | 1/2013 | Choudhuri | G06Q 40/00 705/44 |
| 2013/0036037 A1* | 2/2013 | Meredith | G06Q 20/00 705/35 |
| 2013/0282562 A1* | 10/2013 | Gallo | G06Q 20/12 705/39 |
| 2015/0026027 A1* | 1/2015 | Priess | G06Q 40/00 705/35 |
| 2015/0026061 A1* | 1/2015 | Siegel | G06Q 20/4016 705/44 |
| 2015/0046224 A1* | 2/2015 | Adjaoute | G06Q 30/0202 705/7.31 |
| 2015/0186891 A1* | 7/2015 | Wagner | G06Q 20/4016 705/39 |
| 2015/0193774 A1* | 7/2015 | Wetzel | G06Q 20/4016 705/44 |
| 2015/0195300 A1* | 7/2015 | Adjaoute | H04L 63/1433 726/25 |
| 2015/0213276 A1* | 7/2015 | Adjaoute | G06F 21/60 705/325 |
| 2015/0254659 A1* | 9/2015 | Kulkarni | A61L 31/145 705/71 |
| 2015/0278817 A1* | 10/2015 | Abifaker | G06Q 20/4016 705/44 |
| 2015/0294339 A1* | 10/2015 | Vargas | G06Q 30/0215 705/14.17 |
| 2015/0348040 A1* | 12/2015 | Bhorania | G06Q 20/20 705/16 |
| 2015/0371232 A1* | 12/2015 | Wells | G06Q 20/409 705/44 |
| 2016/0132886 A1* | 5/2016 | Burke | G06Q 20/4016 705/44 |
| 2016/0140562 A1* | 5/2016 | Birukov | G06Q 20/4016 705/39 |
| 2016/0210450 A1* | 7/2016 | Su | G06F 21/316 |
| 2016/0210631 A1* | 7/2016 | Ramasubramanian | G06Q 20/4016 |
| 2016/0275526 A1* | 9/2016 | Becanovic | G06Q 30/0185 |
| 2016/0283975 A1* | 9/2016 | Kaul | G06Q 30/0248 |
| 2016/0314471 A1* | 10/2016 | Gerber | G06Q 20/4016 |
| 2016/0335551 A1* | 11/2016 | Droll | G06Q 20/4016 |
| 2016/0335640 A1* | 11/2016 | Howe | H04W 4/029 |

\* cited by examiner

FIG. 1: US Credit Card-Present Fraud Rate

FIG. 4: False-Positive Reduction

FIG. 6: Fraud Detection Improvement

FALSE POSITIVE REDUCTION IN ABNORMALITY DETECTION SYSTEM MODELS

TECHNICAL FIELD

The subject matter described herein relates to transaction entity abnormality detection systems, and more particularly to false positive reduction in transaction fraud detection system models.

BACKGROUND

A transaction entity is any person or any device, such as a payment card like a credit card or debit card, or such as a mobile computing device, that can execute a transaction. A transaction entity also can include autonomous systems such as client or server computers or network devices that are monitored for abnormality.

In conventional transaction device fraud detection systems, false positives, i.e., a designation of a transaction as being fraudulent when in fact it is not, are a necessary byproduct of successful fraud detection. It is understood that false positives can be reduced but at the expense of reduced fraud detection. While false positives are a concern, it is unnecessary false positives that are of most concern to users of such transaction device fraud detection systems.

One shortcoming of payment card fraud detection systems occurs when a model gives a high score (indicating a high risk of fraud) to a transaction that is very similar to a non-fraud transaction previously completed by a cardholder. The problem is especially acute in cases in which a card is transacting according to the same transaction characteristics, e.g., the same merchant and at the same location, as before. In many cases, the payment card fraud detection system card profile does not have a full transaction history of earlier transactions under such identical transaction characteristics due to the real-time or near-real time processing requirements of many detection systems such as payment card fraud, customer identity take-over, or network monitoring of computers/switches connected to a network.

SUMMARY

This document presents a system and method for false positive reduction in transaction entity abnormality detection system models. The system and method described herein improve overall payment card fraud detection system model performance, as measured by the conventional metrics of Transaction Detection Rate vs. Non-fraud Review Rate. The quality of false positives is improved by reducing the false-positive rate for transactions occurring at the same merchant and/or location as where a consumer has transacted previously. This false-positive reduction also impacts non-fraud transactions that occur while a transaction entity is experiencing fraud. Conversely, the detection rate of actual fraud transactions that occur while a transaction entity is experiencing fraud is improved.

In one aspect, a date and time of a first transaction by a transaction entity is stored in a memory. The first transaction is associated with a transaction characteristic. Data representing one or more subsequent transactions by the transaction entity that are associated with the transaction characteristic are stored in the memory. A history marker profile specific to the transaction characteristic and the transaction entity is generated. The history marker profile includes the transaction characteristic; the date of the first transaction; the time of the first transaction; a maximum abnormality score from a transaction entity abnormality detection system, the maximum score representing a likelihood of abnormality for the first transaction and the one or more subsequent transactions, and being recursively updated based on the first transaction and the one or more subsequent transactions; and a mean abnormality score from the transaction entity abnormality detection system, the mean score representing a likelihood of abnormality for the first transaction and the one or more subsequent transactions, and being recursively updated based on the first transaction and the one or more subsequent transactions. A date and time of a current transaction by the transaction entity are determined. A current abnormality score for the current transaction is received from the transaction entity abnormality detection system. The current abnormality score represents a likelihood of abnormality for the current transaction. A tenure of the observed transaction characteristic is computed by subtracting the date and time of the first transaction from the date and time of the current transaction. The current abnormality score from the transaction entity abnormality detection system is recalibrated according to the maximum abnormality score, the mean score, the current abnormality score, and a length of the tenure.

In some variations one or more of the following can optionally be included.

The maximum abnormality score can be a maximum fraud score and can represent a likelihood of fraud for the first transaction and the one or more subsequent transactions.

The mean abnormality score can be a mean fraud score and can represent a likelihood of fraud for the first transaction and the one or more subsequent transactions.

The transaction characteristic can include a merchant location associated with the first transaction and the one or more subsequent transactions.

The transaction characteristic can include one or more of a monetary amount, a city, a country, a zip code, a merchant category code and a range of monetary amounts, a device identifier, and an IP address.

The transaction entity can be a transaction device from a group of transaction devices that consists of: a consumer, a credit card, a debit card, a prepaid card, a mobile computing device, a desktop computing device, and an automated teller machine.

The transaction entity can be an autonomous device from a group of transaction devices that consists of: a client computer, a server computer, a network device, a switch, a router, a repeater, a domain name, an IP address, and an autonomous system number.

In some preferred implementations, the proposed false-positive reduction methodology provides a significant reduction of false positives for a payment card fraud detection system model using only a minimal amount of additional analytic input information (such as the merchant/location tenure). We observe decreased false positives for transactions at merchant/locations where cards have a 30-day or higher tenure, and we also observe improved fraud detection for the same false-positive rate. The improvements are more substantial for dollar-weighted metrics. Therefore, the proposed methodology can be usefully applied to the scores of existing payment card fraud detection system models as a post-process to reduce false positives.

Implementations of the current subject matter can include, but are not limited to, systems and methods consistent, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide false positive reduction in models of a transaction entity fraud detection system that analyze transactions by a transaction entity, such as a debit card or a credit card or other type of payment card or system. The method is equally applicable to inside fraud monitoring of employees and behaviors of autonomous systems such as computers or network devices. While this document describes various implementations related to transaction entities such as debit cards or credit cards, the methods and systems described herein can be applied to any type of transaction that is scored for abnormality according to one or more models, and to reduce false positive determinations of such scoring. Transaction entities can be can be a customer or consumer, a device or a collection of devices, or a computer and its traffic when taken over by malware, for instance. Other examples of transaction entities include a prepaid card, a mobile computing device, a desktop computing device, an automated teller machine, a client computer, a server computer, a network device, a switch, a router, a repeater, a domain name, an IP address, an autonomous system number, and the like.

Figure 1:
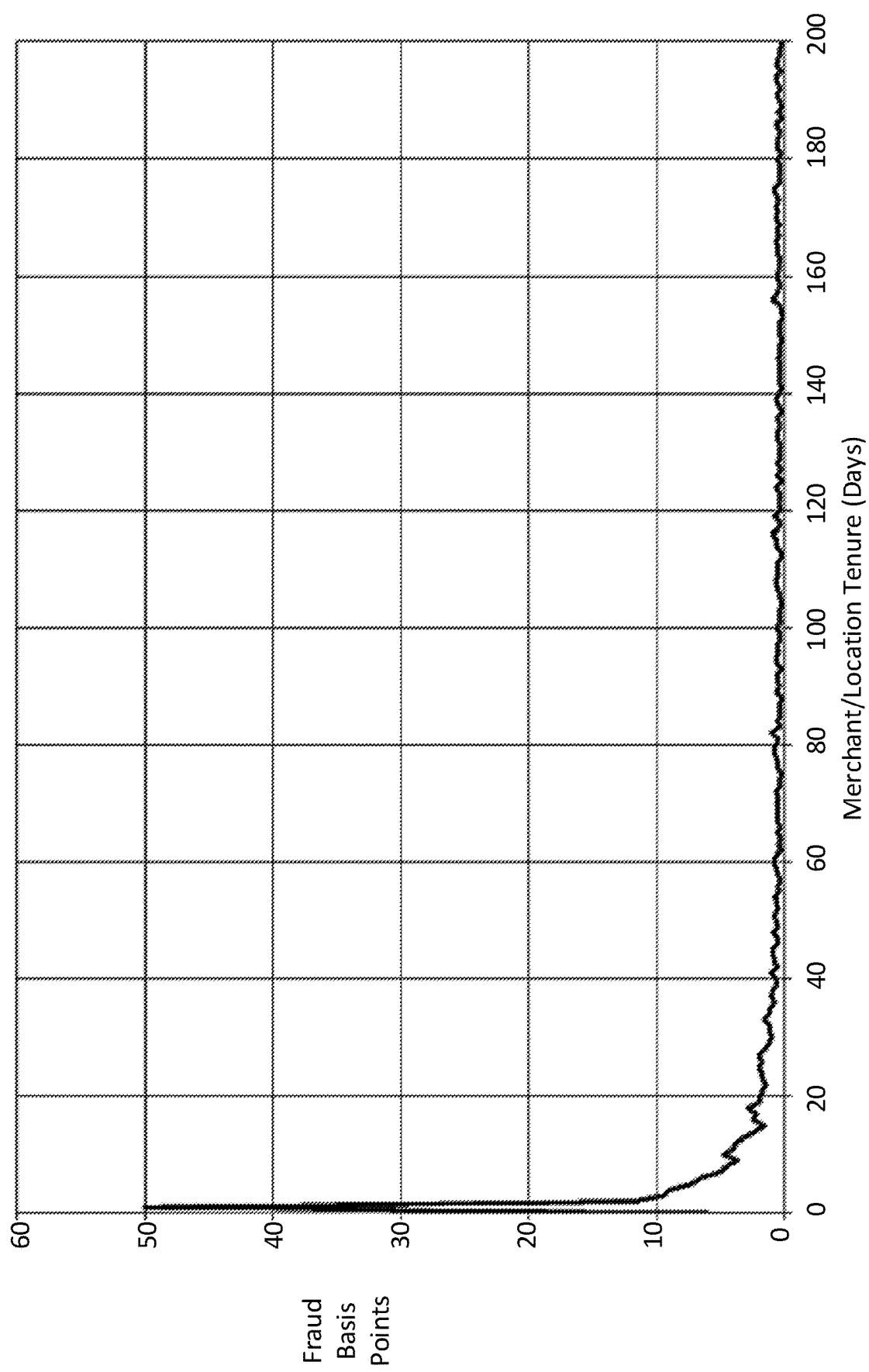
FIGS. 1 and 2 show fraud basis points (using transaction-level fraud tagging and transaction weighting) for U.S. credit "card-present" (CP) and "card-not-present" (CNP) transactions.
Figure 2:
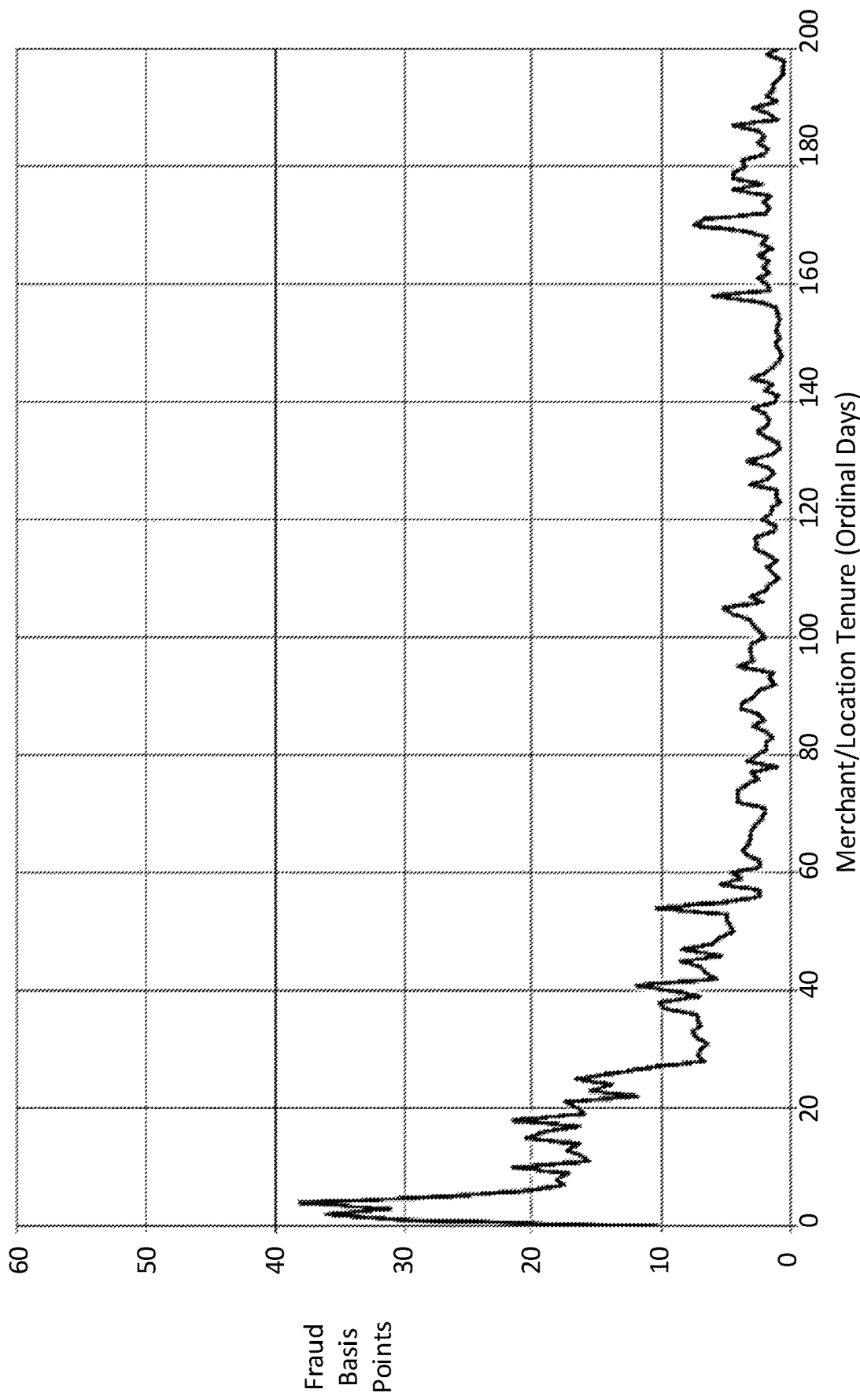

A transaction entity's tenure at a merchant/location (the amount of time since a transaction entity's first transaction at a merchant/location) can be determined, and a fraud risk versus tenure can be considered for better results. Such information is not currently used in transaction entity fraud detection system models. In implementations described herein, the merchant/location can be defined as a combination of the merchant category code, merchant ID, merchant country code, and merchant postal code. Other combinations of fields can also be considered. For tenure, the ordinal day number since a transaction entity's first transaction (i.e., first day, second day, etc.) can be used. However, since it is not unusual for a transaction entity to transact at a new merchant/location (about 40% of non-fraud payment card transactions are in this category), the tenure for the first transaction at a merchant/location can be designated to be the zeroth day, thus separating these transactions from those that occur on the first day, which have a much higher fraud risk. FIGS. 1 and 2 show fraud basis points (using transaction-level fraud tagging and transaction weighting) for U.S. credit "card-present" (CP) and "card-not-present" (CNP) transactions.

Fraud activity usually occurs at a merchant/location not formerly visited by the legitimate transaction entity or owner thereof. In addition, the new merchant/location has more of a tendency for additional follow-up visits a short time later when a transaction entity is being used fraudulently. On the other hand, a transaction at a merchant/location at which a transaction entity has had a reasonable tenure and a reasonable number of transactions is very likely to be non-fraud. Thus, it can be seen that the fraud rate is initially elevated, becoming more elevated early in a transaction entity's merchant/location tenure, followed by a period in which the fraud rate asymptotes to a long-term level.

False Positive Reduction Methodology

In accordance with preferred implementations, merchant and/or location information can be tracked by introducing a new history marker profile for each combination of transaction entity identifier, such as a card number, and the merchant/location fields. In an example of a transaction entity being a credit card or debit card, for the results shown, the history marker profile variables can be retained for each combination of card number and merchant/location fields, and can include any of: 1) one or more transaction characteristics including, for example, any combination of a merchant identifier (e.g., the merchant's name), a merchant location associated with a first transaction and one or more subsequent transactions, a monetary amount, a city, a country, a zip code (such as the first 3 digits of a zip code, for example), a merchant category code and a range of monetary amounts, a device identifier, an IP address, and the like; 2) date of first transaction; 3) time of first transaction; 4) a measure of a maximum abnormality score from a transaction entity abnormality detection system (including, for example, a maximum transaction device fraud detection system score) that is representative of a likelihood of abnormality for the first transaction and one or more subsequent transactions, recursively updated based on the first transaction and one or more subsequent transactions; and 5) a measure of a mean abnormality score from a transaction entity abnormality detection system (including, for example, a mean transaction device fraud detection system score) that is representative of a likelihood of abnormality for the first transaction and one or more subsequent transactions, recursively updated based on the first transaction and one or more subsequent transactions.

This information can be stored in a memory or database as four floating-point numbers per history marker profile record. After obtaining a standard transaction entity fraud detection system score for a transaction, the following post-processing steps can be taken:

Compute the transaction entity's tenure at the merchant/location. This can be done by subtracting the date-time of the first transaction at the merchant/location (stored in the history marker profile) from the current transaction date-time.

View the score of the current transaction at a merchant/location in light of prior scores at the same merchant/location. For the first day after a transaction entity's initial transaction at a merchant/location, the maximum score can be outputted; otherwise, some measure of the mean score can be outputted. The duration for the use of the maximum score can be changed to other values. The intent is to output the maximum score during the highest risk period of the tenure. In some implementations, the average score can be computed by using a five-event average of the log odds of the transaction entity fraud detection system score, transforming the average log odds back to a score. Alternative score outputs, utilizing the current score, maximum score, and mean score can also be employed.

The original transaction entity fraud detection system score may not accurately assess the probability of fraud vs. merchant/location tenure, therefore the score outputted in the second step can be recalibrated based on tenure, appropriately segmented. One approach is to bin the tenure in 1-day increments and determine the average additive adjustment to the log-odds of the output score needed to align it to the fraud probability. This binning and averaging can be used directly in the score, or not reflected in the initial score but used for score adjustment. Further, it can be used in the score response, and in a rules strategy. Alternative score adjustments based on tenure can also be applied.

The main objective of score adjustment based on a transaction entity's tenure at a merchant/location is to reduce false positives once a transaction entity has an established relationship at a merchant/location. A given score threshold will have an associated overall false-positive rate. The false-positive rate at that score threshold for a subpopulation of transactions, for which there is an established relationship between transaction entity and merchant/location, can then be considered. Varying the score threshold, the false-positive rate for the subpopulation vs. the overall false-positive rate can be established and plotted. If the score adjustment techniques described above are working, then a lower false-positive rate in the high-tenure subpopulation vs. the overall false-positive rate is expected.

Figure 3:
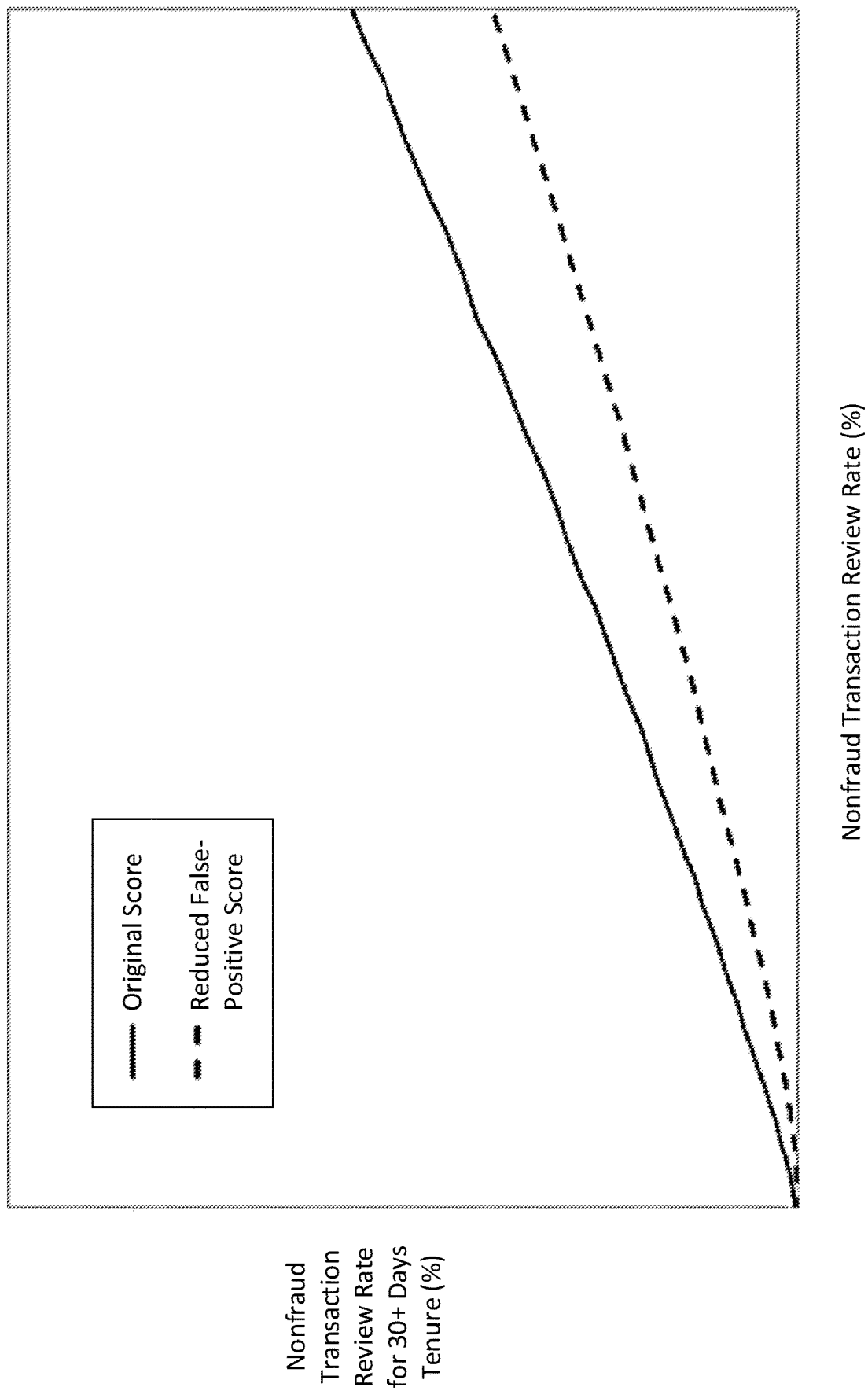
FIGS. 3 and 4 show false-positive reduction of the transaction entity fraud detection system model.
Figure 4:
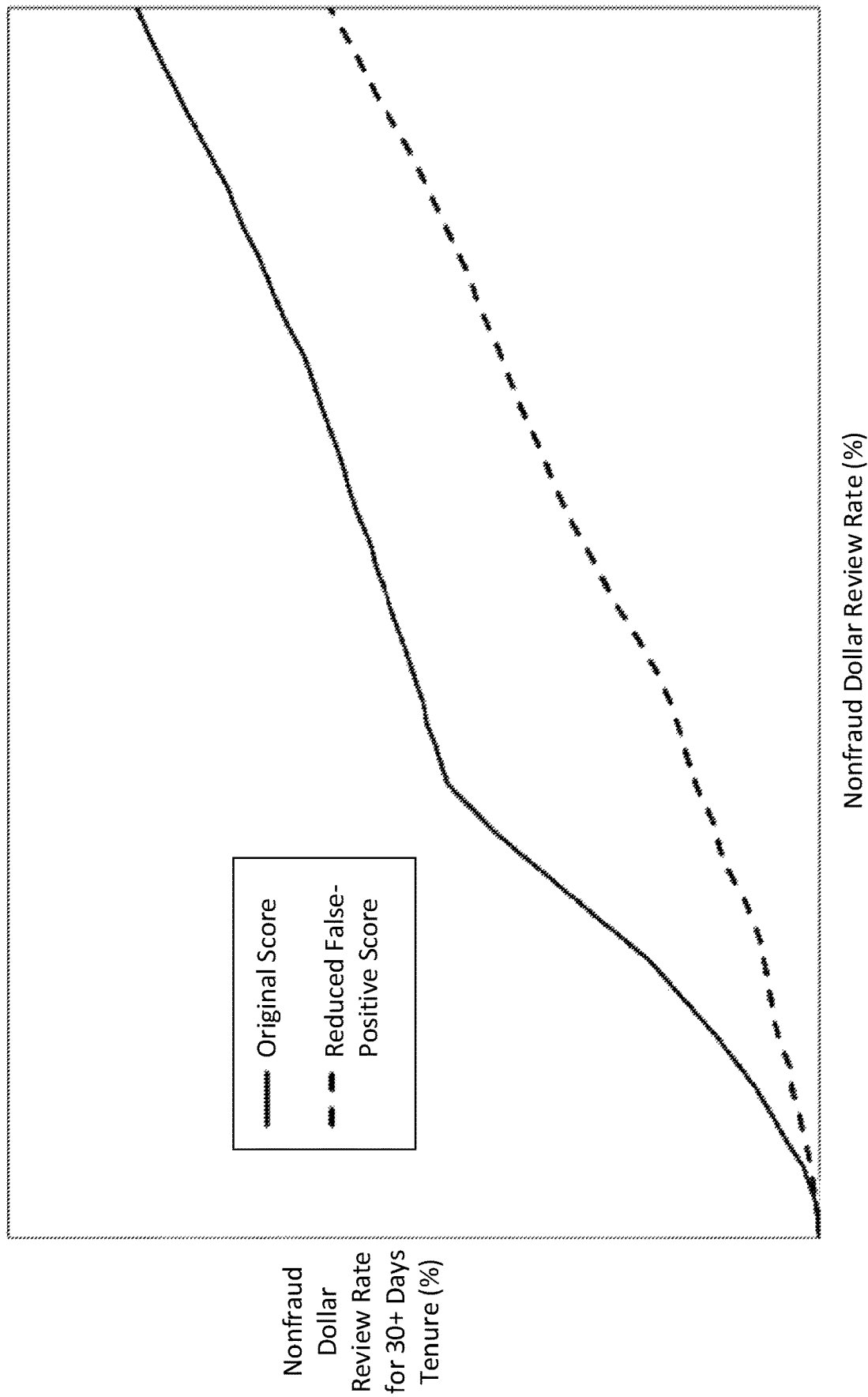

In some implementations, only transactions in which a transaction entity's tenure at the merchant/location is in the $30^{th}$ day or more can be considered. This subset consists of about 40% of all transactions for transaction entities in typical US card fraud such as credit cards or debit cards. The false-positive rate is measured using the percentage of non-fraud transactions reviewed and the percentage of non-fraud dollars reviewed. Using the primary approach described above, the false-positive reduction of the transaction entity fraud detection system is shown in FIGS. 3 and 4.

Figure 5:
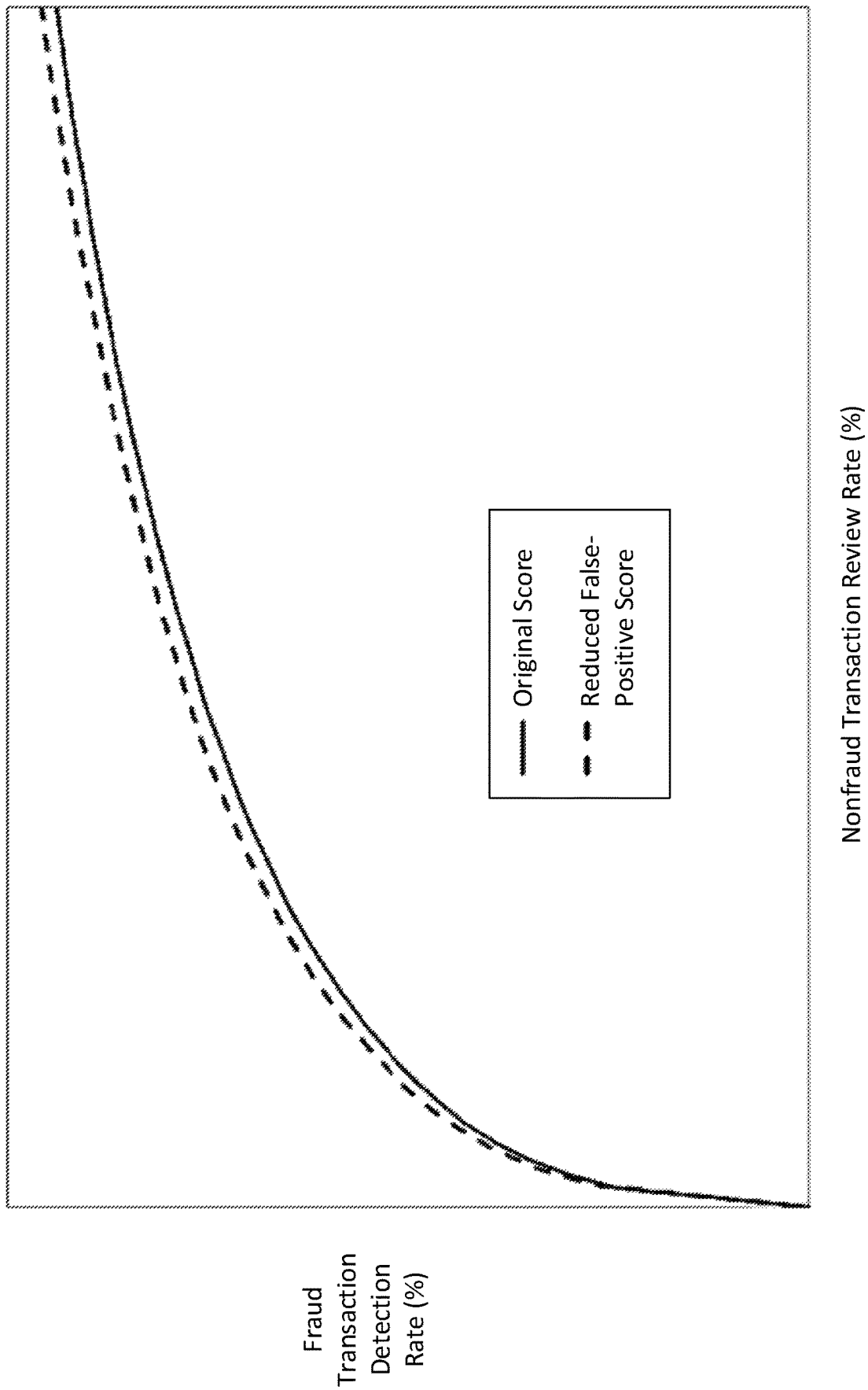
FIGS. 5 and 6 illustrate an improvement in the percentage of fraud transactions or dollars detected while reviewing the same percentage of non-fraud transactions or dollars.
Figure 6:
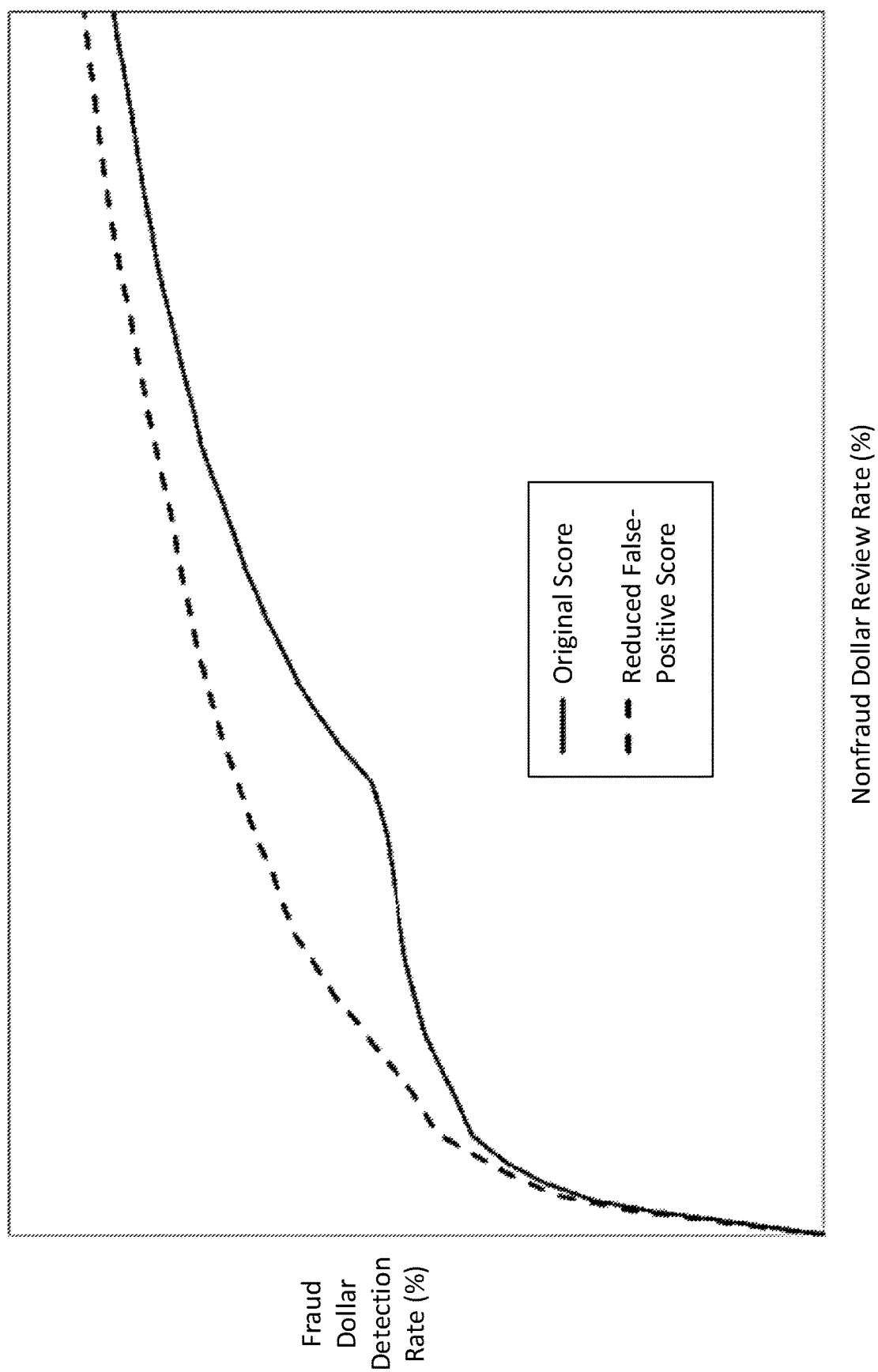

It can be seen that the false-positive rates (the non-fraud review rates) have been reduced for the subset of transactions at which the transaction entity has an established relationship, as indicated by being in the $30^{th}$ day or higher since the first transaction. Fortunately, we find that the fraud detection capabilities of the model, as measured by fraud detection rate vs. false-positive rate, have also improved. Using the primary approach described above, we can evaluate the performance of the payment card fraud detection system, as shown in FIGS. 5 and 6, which illustrate a substantial improvement in the percentage of fraud transactions or dollars detected while reviewing the same percentage of non-fraud transactions or dollars.

The proposed false-positive reduction methodology can provide a significant reduction of false positives for a transaction entity fraud detection system model using only a minimal amount of additional analytic input information (the merchant/location tenure). Decreased false positives for transactions at merchant/locations where transaction entities such as credit cards or debit cards have a 30-day or higher tenure can be observed, as can improved fraud detection for the same false-positive rate. The improvements are more substantial for dollar-weighted metrics. Therefore, the methods and systems described herein can be usefully applied to the scores of existing transaction entity fraud detection system models as a post-process to reduce false positives.

Figure 7:
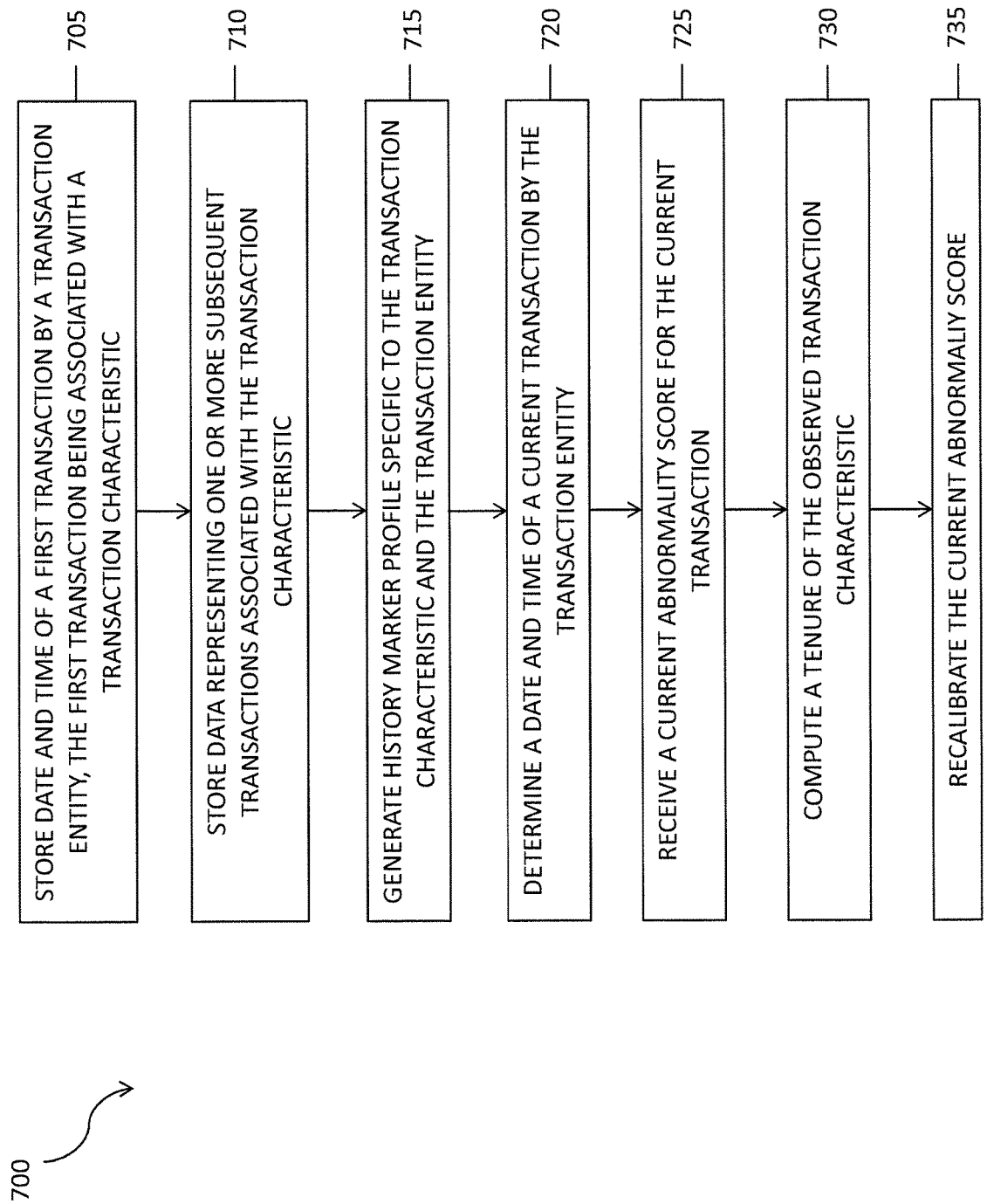
FIG. 7 illustrates a process for reducing false positives in transaction entity abnormality detection system models.

FIG. 7 illustrates a process 700 for false positive reduction in transaction entity abnormality detection system models in accordance with the implementations described herein.

At 705, a date and time of a first transaction by a transaction entity can be stored in memory. The first transaction can be associated with a transaction characteristic.

At 710, data representing one or more subsequent transactions by the transaction entity and that are associated with the transaction characteristic can be stored in memory.

At 715, a history marker profile can be generated. The history marker profile can be specific to the transaction characteristic and the transaction entity. The history marker profile can include the transaction characteristic; the date of the first transaction; the time of the first transaction; a maximum abnormality score from a transaction entity abnormality detection system, the maximum score representing a likelihood of abnormality for the first transaction and the one or more subsequent transactions, and being recursively updated based on the first transaction and the one or more subsequent transactions; and a mean abnormality score from the transaction entity abnormality detection system, the mean score representing a likelihood of abnormality for the first transaction and the one or more subsequent transactions, and being recursively updated based on the first transaction and the one or more subsequent transactions.

At 720, a date and time of a current transaction by the transaction entity can be determined.

At 725, a current abnormality score for the current transaction can be received from the transaction entity abnormality detection system. The current abnormality score can represent a likelihood of abnormality for the current transaction.

At 730, a tenure of the observed transaction characteristic can be computed by subtracting the date and time of the first transaction from the date and time of the current transaction.

At 735, the current abnormality score from the transaction entity abnormality detection system can be recalibrated according to the maximum abnormality score, the mean score, the current abnormality score, and a length of the tenure.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

storing in a memory, by at least one data processor, a date and time of a first transaction by a transaction entity, the first transaction being associated with at least one transaction characteristic, wherein the at least one transaction characteristic comprises a merchant location;

storing in the memory, by the at least one data processor, data representing one or more subsequent transactions by the transaction entity that are associated with the at least one transaction characteristic;

generating, by the at least one processor, a history marker profile specific to the at least one transaction characteristic and the transaction entity, the history marker profile comprising:

the at least one transaction characteristic;

the date of the first transaction;

the time of the first transaction;

a maximum abnormality score from a transaction entity abnormality detection system, the maximum score representing a likelihood of abnormality for the first transaction and the one or more subsequent transactions, and being recursively updated based on the first transaction and the one or more subsequent transactions; and a mean abnormality score from the transaction entity abnormality detection system, the mean abnormality score representing a likelihood of abnormality for the first transaction and the one or more subsequent transactions, and being recursively updated based on the first transaction and the one or more subsequent transactions;

determining, by the at least one data processor, a date and time of a current transaction received via a network from the transaction entity with the at least one transaction characteristic;

receiving, by the at least one data processor from the transaction entity abnormality detection system, a current abnormality score for the current transaction, the current abnormality score representing a likelihood of abnormality for the current transaction;

computing, by the at least one data processor, a tenure of the at least one transaction characteristic by subtracting the date and time of the first transaction by the transaction entity with the at least one transaction characteristic from the date and time of the current transaction by the transaction entity with the at least one transaction characteristic; and recalibrating, by the at least one data processor, the current abnormality score from the transaction entity abnormality detection system according to the maximum abnormality score, the mean abnormality score, the current abnormality score, and a length of the tenure.

2. The method in accordance with claim 1, wherein the maximum abnormality score is a maximum fraud score, and represents a likelihood of fraud for the first transaction and the one or more subsequent transactions.

3. The method in accordance with claim 1, wherein the mean abnormality score is a mean fraud score, and represents a likelihood of fraud for the first transaction and the one or more subsequent transactions.

4. The method in accordance with claim 1, wherein the at least one transaction characteristic further comprises one or more of a monetary amount, a city, a country, a zip code, a merchant category code and a range of monetary amounts, a device identifier, and an IP address.

5. The method in accordance with claim 1, wherein the transaction entity is a transaction device from a group of transaction devices that consists of: a consumer, a credit card, a debit card, a prepaid card, a mobile computing device, a desktop computing device, and an automated teller machine.

6. The method in accordance with claim 1, wherein the transaction entity is an autonomous device from a group of transaction devices that consists of: a client computer, a server computer, a network device, a switch, a router, a repeater, a domain name, an IP address, and an autonomous system number.

7. A system comprising:
at least one processor; and
at least one memory, wherein the at least one processor and the at least one memory are configured to perform operations comprising:
storing in a memory a date and time of a first transaction by a transaction entity, the first transaction being associated with at least one transaction characteristic, wherein the at least one transaction characteristic comprises a merchant location;
storing in the memory data representing one or more subsequent transactions by the transaction entity that are associated with the at least one transaction characteristic;
generating a history marker profile specific to the at least one transaction characteristic and the transaction entity, the history marker profile comprising:
the at least one transaction characteristic;
the date of the first transaction;
the time of the first transaction;
a maximum abnormality score from a transaction entity abnormality detection system, the maximum score representing a likelihood of abnormality for the first transaction and the one or more subsequent transactions, and being recursively updated based on the first transaction and the one or more subsequent transactions; and
a mean abnormality score from the transaction entity abnormality detection system, the mean abnormality score representing a likelihood of abnormality for the first transaction and the one or more subsequent transactions, and being recursively updated based on the first transaction and the one or more subsequent transactions;

determining a date and time of a current transaction received via a network from the transaction entity with the at least one transaction characteristic;

receiving from the transaction entity abnormality detection system a current abnormality score for the current transaction, the current abnormality score representing a likelihood of abnormality for the current transaction;

computing a tenure of the at least one transaction characteristic by subtracting the date and time of the first transaction by the transaction entity with the at least one transaction characteristic from the date and time of the current transaction by the transaction entity with the at least one transaction characteristic; and recalibrating the current abnormality score from the transaction entity abnormality detection system according to the maximum abnormality score, the mean abnormality score, the current abnormality score, and a length of the tenure.

8. The system in accordance with claim 7, wherein the maximum abnormality score is a maximum fraud score, and represents a likelihood of fraud for the first transaction and the one or more subsequent transactions.

9. The system in accordance with claim 7, wherein the mean abnormality score is a mean fraud score, and represents a likelihood of fraud for the first transaction and the one or more subsequent transactions.

10. The system in accordance with claim 7, wherein the at least one transaction characteristic further comprises one or more of a monetary amount, a city, a country, a zip code, a merchant category code and a range of monetary amounts, a device identifier, and an IP address.

11. The system in accordance with claim 7, wherein the transaction entity is a transaction device from a group of transaction devices that consists of: a consumer, a credit card, a debit card, a prepaid card, a mobile computing device, a desktop computing device, and an automated teller machine.

12. The system in accordance with claim 7, wherein the transaction entity is an autonomous device from a group of transaction devices that consists of: a client computer, a server computer, a network device, a switch, a router, a repeater, a domain name, an IP address, and an autonomous system number.

13. A non-transitory computer-readable medium containing instructions to configure a processor to perform operations comprising:
storing in a memory a date and time of a first transaction by a transaction entity, the first transaction being associated with at least one transaction characteristic, wherein the at least one transaction characteristic comprises a merchant location;
storing in the memory data representing one or more subsequent transactions by the transaction entity that are associated with the at least one transaction characteristic;
generating a history marker profile specific to the at least one transaction characteristic and the transaction entity, the history marker profile comprising:
the at least one transaction characteristic;
the date of the first transaction;
the time of the first transaction;
a maximum abnormality score from a transaction entity abnormality detection system, the maximum score representing a likelihood of abnormality for the first transaction and the one or more subsequent transactions, and being recursively updated based on the first transaction and the one or more subsequent transactions; and a mean abnormality score from the transaction entity abnormality detection system, the mean abnormality score representing a likelihood of abnormality for the first transaction and the one or more subsequent transactions, and being recursively updated based on the first transaction and the one or more subsequent transactions;

determining a date and time of a current transaction received via a network from the transaction entity with the at least one transaction characteristic;

receiving from the transaction entity abnormality detection system a current abnormality score for the current transaction, the current abnormality score representing a likelihood of abnormality for the current transaction;

computing a tenure of the at least one transaction characteristic by subtracting the date and time of the first transaction by the transaction entity with the at least one transaction characteristic from the date and time of the current transaction by the transaction entity with the at least one transaction characteristic; and recalibrating the current abnormality score from the transaction entity abnormality detection system according to the maximum abnormality score, the mean abnormality score, the current abnormality score, and a length of the tenure.

14. The non-transitory computer-readable medium in accordance with claim 13, wherein the maximum abnormality score is a maximum fraud score, and represents a likelihood of fraud for the first transaction and the one or more subsequent transactions.

15. The non-transitory computer-readable medium in accordance with claim 13, wherein the mean abnormality score is a mean fraud score, and represents a likelihood of fraud for the first transaction and the one or more subsequent transactions.

16. The non-transitory computer-readable medium in accordance with claim 13, wherein the at least one transaction characteristic further comprises one or more of a monetary amount, a city, a country, a zip code, a merchant category code and a range of monetary amounts, a device identifier, and an IP address.

17. The non-transitory computer-readable medium in accordance with claim 13, wherein the transaction entity is a transaction device from a group of transaction devices that consists of: a consumer, a credit card, a debit card, a prepaid card, a mobile computing device, a desktop computing device, and an automated teller machine.

18. The non-transitory computer-readable medium in accordance with claim 13, wherein the transaction entity is an autonomous device from a group of transaction devices that consists of: a client computer, a server computer, a network device, a switch, a router, a repeater, a domain name, an IP address, and an autonomous system number.

* * * * *